Sept. 2, 1947.  A. HASBROUCK ET AL  2,426,874
RADIAL AIRCRAFT ENGINE
Filed Sept. 1, 1944  2 Sheets-Sheet 2
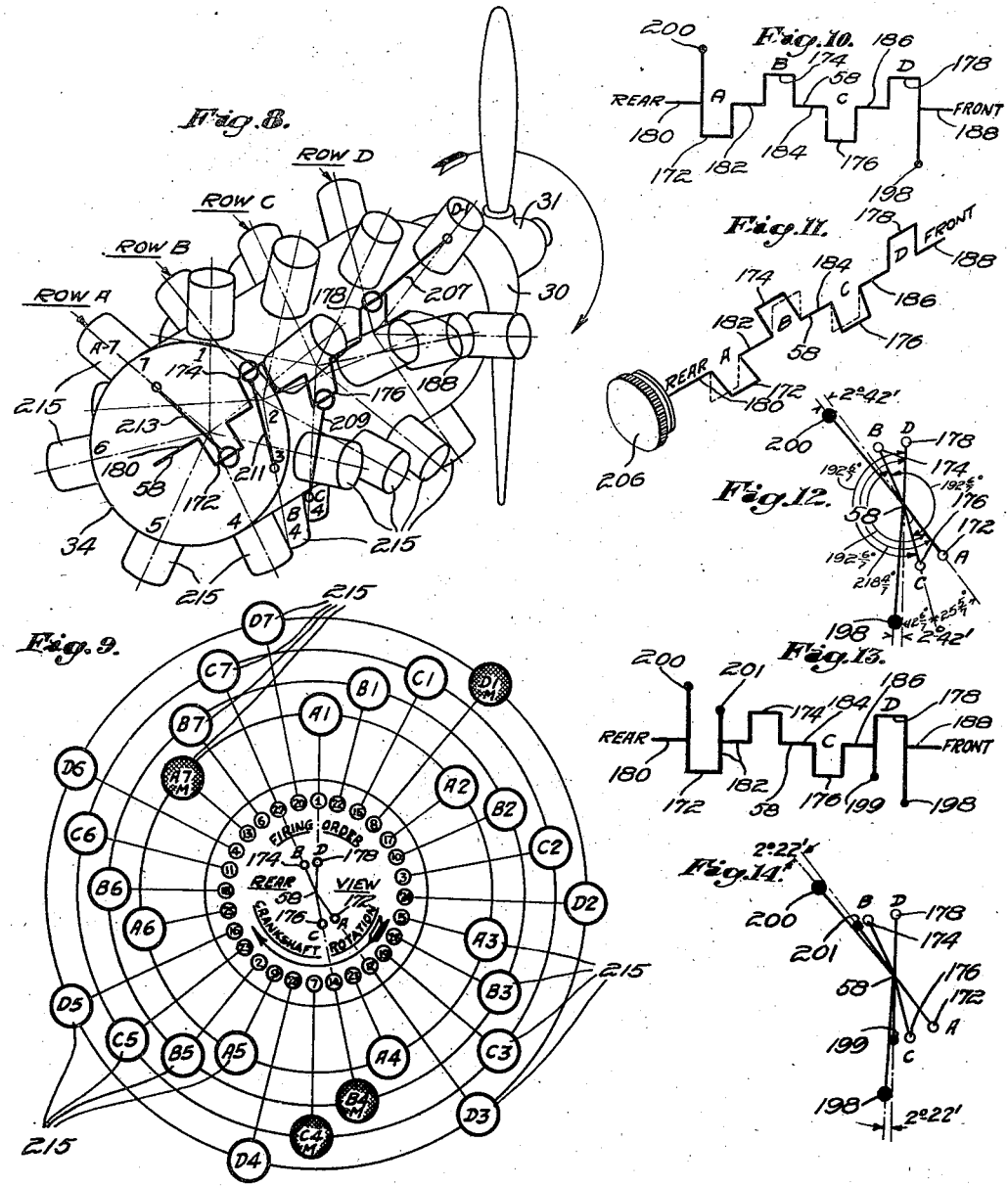

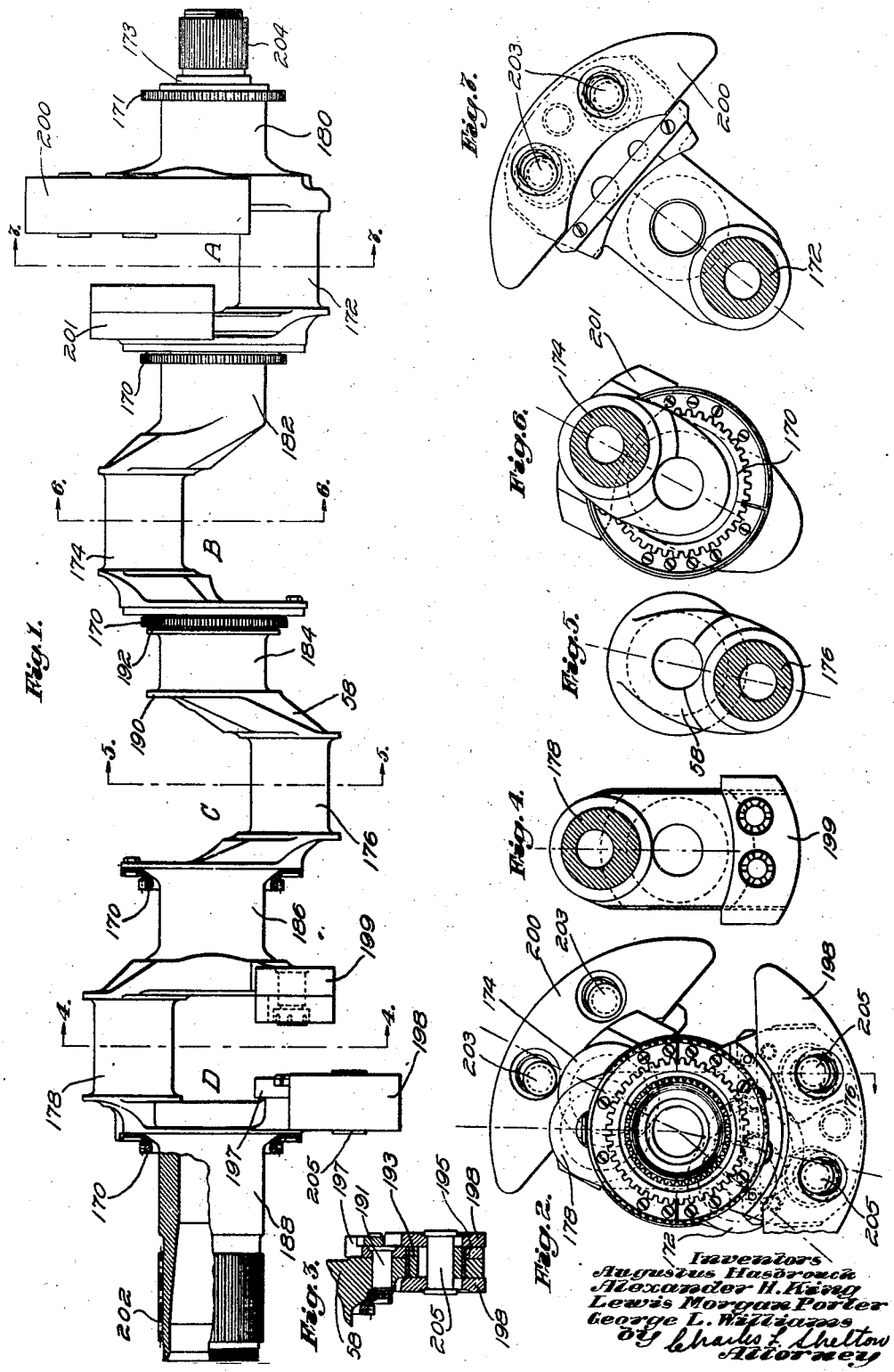

Patented Sept. 2, 1947

2,426,874

UNITED STATES PATENT OFFICE 2,426,874

RADIAL AIRCRAFT ENGINE

Augustus Hasbrouck, Middletown, Alexander H. King, West Hartford, and Lewis Morgan Porter and George L. Williams, Manchester, Conn., assignors to United Aircraft Corporation, East Hartford, Conn., a corporation of Delaware Application September 1, 1944, Serial No. 552,370

2 Claims. (Cl. 74—603)

This invention relates to multi-row radial aircraft engines.

An object of this invention is to provide an improved crankshaft having exceptionally good balance with a minimum of counterweighting, and which is particularly adapted for use in a four row radial engine of the type disclosed in the Hobbs-Willgoos application Serial No. 552,372 filed concurrently herewith and assigned to applicants' assignee.

A further object of this invention is to provide a novel and improved crankshaft and cylinder combination and arrangement for a multi-row radial engine.

Other objects and advantages will be apparent from the specification and claims, and from the accompanying drawings which illustrate what is now considered to be a preferred embodiment of the invention.

In the drawings:

Fig. 1 is a side view of the crankshaft of this invention.

Fig. 2 is a front view of the crankshaft of Fig. 1 with a portion of one of the counterweights omitted.

Fig. 3 is a section along the line indicated by the arrows in Fig. 2.

Figs. 4 to 7 are sectional views taken along the lines 4—4, 5—5, 6—6 and 7—7 of Fig. 1.

Fig. 8 is a schematic isometric view of a four row radial engine including the novel cylinder and crankshaft combination and arrangement of this invention.

Fig. 9 is a diagrammatic view showing the spacing of the axes of the cylinders of Fig. 8, and their relation to the position of the crankshaft throws.

Figs. 10 and 12 are schematic side and rear views of the crankshaft and counterweights.

Fig. 11 is a schematic isometric view of the crankshaft.

Figs. 13 and 14 are schematic side and rear views of the crankshaft showing a modification of the counterweighting.

According to this invention, a crankshaft for a four row radial engine is formed with crankthrows and counterbalances combined and arranged in a novel manner which provides exceptionally good engine balance with a minimum of counterweighting, and which enables all the counterweighting to be placed on the end crankthrows, thereby reducing weight to a minimum. Furthermore, the crankshaft arrangement is such as to provide good inherent balance with minimum main bearing loads; and, in combination with a novel cylinder arrangement, is such as to provide exceptionally good engine firing and vibrational characteristics.

Referring to Fig. 1, the crankshaft 58 is a one-piece steel forging which is machined and carefully balanced. It has four crankpins 172, 174, 176, 178 and five main supporting journals 180, 182, 184, 186, 188, the journals being located at the ends of the crankshaft and between the crankpins. Front and rear splined power takeoffs are provided at 202 and 204, spline 204 being formed on a quill 173 splined within the rear journal portion 180. The center journal 184 has flanged ends 190, 192, which serve to locate the shaft axially and transmit thrust through the center main bearing and its support (not shown) to the crankcase 34. As shown in Figs. 2 and 4 to 7, adjacent crankpins are spaced angularly by 180° plus a small additional angle of twist corresponding to the spacing of the engine cylinders in adjacent cylinder rows.

The relationship between the crankpin spacing and the cylinder spacing is shown diagrammatically in Figs. 8 and 9. Cylinders 215 are mounted on the crankcase 34 in four circumferential rows A, B, C, D of seven cylinders each. The cylinders of each row are angularly displaced with respect to the corresponding cylinders in adjacent rows so that all the cylinders are equally spaced around the crankshaft axis. The cylinders are displaced in the same direction progressively from the front to the rear of the engine so that each of the seven cylinder banks, marked 1—7 in Fig. 8, forms a right-hand helix about the axis of crankshaft 58. The relationship between the spacing of the crankpins 172, 174, 176 and 178 and the spacing of the axes of the cylinders in the corresponding rows A, B, C, and D is shown diagrammatically in Fig. 9, which is a representation of the relative angular position of the cylinders as projected on a plane normal to the crankshaft axis. As there are 28 cylinders in all, the spacing between any two adjacent cylinders is $12^6/_7°$.

The crankpins are angularly spaced around the longitudinal axis of the crankshaft so that they are positioned alternately on opposite sides of the crankshaft axis and are in alignment with the axes of the cylinders in the helical cylinder banks when the crankshaft is in a position as shown in Fig. 9. Starting with the rear crankpin 172 and looking toward the front, the intermediate rear crankpin 174 is located $192^6/_7°$ from the crankpin 172 in a clockwise direction. Likewise, the center of each succeeding crankpin is positioned $192^6/_7°$ clockwise from the crankpin immediately behind it. The front crankpin 178 is $218^{4}/_{7}°$, clockwise rotation, from the rear crankpin 172.

The crankshaft is approximately flat. If it were not for the displacement of each throw by $12^{6}/_{7}°$ to accord with the displacement of the cylinders of each bank, the throws would all lie in the single plane indicated by the dotted lines in Fig. 11. As shown in this figure, adjacent throws are disposed on opposite sides of the crankshaft, and the three rear throws are positioned alternately on opposite sides of the plane of the front throw D. With such an arrangement the load on each of the main bearings which support the journals 180, 182, 184, 186, 188, will be approximately a minimum.

Each throw and its associated weight acts to a large extent as a balance weight for an adjacent throw and its associated weight, and intermediate counterweights opposite the crankpins 174, 176, are therefore unnecessary.

The pairs of throws A, B and C, D each produce additive rocking couples which tend to rotate the crankshaft in a counterclockwise direction, as viewed in Figs. 10, 11 and 13. However, these couples and any other unbalanced primary force of material size may be readily balanced simply by a pair of counterweights 198, 200, opposite the end crank-throws. These two counterweights are preferably made of the suspended torsional damper type, as shown in Figs. 1, 2, 3 and 7, and tuned to the firing frequency of a cylinder row. The counterweights are suspended on pins 203, 205 which rest on bearings 193 supported by liners 195 within a bore extending through the crankshaft and through a plate 197 riveted to the crankshaft at 191. If desired, the counterweights 198, 200 may be split to provide four counterweights in all, as shown in Figs. 13 and 14, two of which, 200, 201, are located opposite the rear or A crankthrow and the other two of which, 198, 199, are located opposite the front or D crankthrow.

Crankthrows A, B, C, D do not lie exactly in the same plane (Fig. 11) but are angularly displaced in accordance with the cylinder displacement (Fig. 9). This displacement or twist of the throws is compensated for in balancing by displacing the end counterweights 198, 200 angularly with respect to the crankthrows, thus obviating the use of intermediate or additional counterweights. Counterweight 198 is displaced by two degrees and 42 minutes in a clockwise direction from the plane of the front crankthrow D, as shown in Fig. 12. Rear counterweight 200 is displaced in the opposite or counterclockwise direction by the same angle from the plane of the rear crankthrow A. Where four counterweights are used, the auxiliary counterweights 199, 201 may be placed in the plane of the respective throws D and A; in this case the end counterweights 198, 200 are displaced from the plane of their throws by an angle of two degrees and 22 minutes, as shown in Fig. 14.

The cylinder arrangement and crankthrow arrangement shown in Figs. 8–14 provides for two pistons in any one bank to be simultaneously on top dead center when the other two pistons of the same bank are on bottom dead center, thus enabling the cylinders of each bank to be fired at equal intervals, as well as providing for firing the engine as a whole at equal intervals, as shown within the innermost circle in Fig. 9. The crankpins may be connected to the pistons by articulated connecting rod systems, including master rods 207, 209, 211, 213, and to a propeller 31 by a reduction gear within the nose section 30 as specifically disclosed in the Hobbs-Willgoos application Serial No. 552,372, filed concurrently herewith.

Reference is made to our applications Serial No. 552,368 and Serial No. 552,369, filed concurrently herewith, which claim subject matter disclosed and not claimed in this application.

The word "longitudinal" is used in a broad sense in this application to include cylinder banks extending generally lengthwise.

It is to be understood that the invention is not limited to the specific embodiment herein illustrated and described. For instance, it may be used in engines having five or nine longitudinal banks, or more than four circumferential rows, or in other ways without departure from its spirit as defined by the following claims.

We claim:

1. A balanced crankshaft for a twenty-eight cylinder four row radial engine comprising, four longitudinally spaced crankthrows having crankpins relatively positioned so that each crankpin is angularly spaced by approximately one hundred and ninety-three degrees from the adjacent crankpin or crankpins, and a pair of counterweights positioned respectively opposite the end crankpins and being displaced angularly with respect to the plane of the corresponding crankthrow by an angle of the order of two or three degrees.

2. In a radial aircraft engine having a plurality of cylinders arranged in four circumferential rows and in spiral banks, a crankshaft having crankpins respectively associated with said rows, said cylinders being equally spaced around said crankshaft, said crankpins being progressively angularly displaced by angles of 180° plus the angle of spacing of said cylinders.

AUGUSTUS HASBROUCK.
ALEXANDER H. KING.
LEWIS MORGAN PORTER.
GEORGE L. WILLIAMS.

REFERENCES CITED

The following references are of record in the file of this patent:

UNITED STATES PATENTS

| Number | Name | Date |
| --- | --- | --- |
| 1,692,914 | Wintzer | Nov. 27, 1928 |
| 1,367,194 | Le Franc | Feb. 1, 1921 |
| 1,574,219 | Walker | Feb. 23, 1926 |
| 1,552,174 | Kress | Sept. 1, 1925 |

FOREIGN PATENTS

| Number | Country | Date |
| --- | --- | --- |
| 306,942 | Great Britain | Feb. 27, 1930 |